United States Patent [19]

Hernandez et al.

[11] Patent Number: 4,536,146
[45] Date of Patent: Aug. 20, 1985

[54] CROQUETTE MACHINE

[76] Inventors: Luis A. Hernandez, 8160 W. 16th Ave., Hialeah, Fla. 33014; Jorge E. Gonzalez, 4724 SW. 7 St., Apt. #1, Miami, Fla. 33134

[21] Appl. No.: 671,928

[22] Filed: Nov. 16, 1984

[51] Int. Cl.³ .............................................. A21C 3/00
[52] U.S. Cl. .................... 425/297; 425/319; 425/397; 425/402; 425/138; 425/311; 425/308; 426/513; 426/516; 118/13
[58] Field of Search ............... 425/297, 296, 308, 311, 425/319; 426/513, 516

[56] References Cited

U.S. PATENT DOCUMENTS

| | | | |
|---|---|---|---|
| 2,488,046 | 11/1949 | Werner et al. | 425/311 |
| 4,028,024 | 6/1977 | Moreland | 425/296 X |
| 4,056,346 | 11/1977 | Hayashi | 425/297 X |
| 4,152,102 | 5/1979 | Sasiela et al. | 425/308 X |
| 4,268,532 | 5/1981 | Bernard | 426/513 X |
| 4,340,343 | 7/1982 | Mancini | 425/297 X |
| 4,340,345 | 7/1982 | Schurman | 425/297 X |
| 4,343,603 | 8/1982 | Pavlow et al. | 425/308 X |
| 4,388,059 | 6/1983 | Ma | 425/297 X |
| 4,404,229 | 9/1983 | Treharne | 426/513 |
| 4,478,565 | 10/1984 | Thompson | 425/296 X |
| 4,483,046 | 11/1984 | Briddell | 425/296 X |

Primary Examiner—J. Howard Flint, Jr.
Attorney, Agent, or Firm—Robert M. Schwartz

[57] ABSTRACT

A machine for manufacturing croquettes from a source of elastic food mass continuously discharged from a nozzle assembly having a reciprocating chopper controlled by sensors for severing the mass into croquettes, a plurality of conveyors for moving said croquettes through tunnel assemblies for compressing said croquettes into a desired shape and a shaker assembly for breading said croquettes and providing a frictional means for rolling said croquettes through said tunnels.

14 Claims, 12 Drawing Figures

CROQUETTE MACHINE

BACKGROUND OF THE INVENTION

1. Field of the Invention

The present invention relates to an automated machine for making edible croquettes wherein said croquettes are made from a stuffing and are produced in elongated cylindrical form, having rounded half spherical ends.

2. Description of the Prior Art

The primary means of making a croquette in an elongated cylindrical form, which is made up of stuffings, has been by hand. The procedure included shaping an elongated mass of stuffing into a narrow cylindrical form, then cutting this cylindrical form into shorter lengths: croquettes.

Often times, bread crumbs are added to this cylindrical croquette which make an improvement for cooking and frying the croquette.

However, these croquettes, like many items produced by hand, do not have a uniform shape or size. Furthermore, the ends are cut flat, which make for an uneven and unsightly appearance.

Additionally, when the stuffing mass is rolled into a cylindrical form, a swirl within the mass is created and does not make for a relaxed croquette stuffing.

Heretofore, there have been no machines to manufacture cylindrical croquettes. However, the desirability of manufacturing an elongated cylindrical product with rounded spherical ends has been recognized in U.S. Pat. No. 4,404,229, issued on Sep. 13, 1983, to Tivel Developments, Ltd., entitled: Method for the Production of Molded Meat or Meat-Like Products. This invention, primarily for sausage links and hot dogs, recognized the need for rounded spherical ends and cylindrical link products. Their solution was to insert a mass into an elongated cavity. Insert a plunger to fill the cavity with a filler and then withdraw the plunger. Caps at each end of the cavity form the ends of the product. The end product must then be withdrawn from the cavity.

As will be seen, the present invention extrudes a filler in a continuous elongated cylindrical form. U.S. Pat. No. 2,488,046, dated Nov. 15, 1949, issued to F. C. Werner et al. entitled "Dough Extruding and Cutting Machine", includes a hopper 7 which extrudes dough from nozzle 11. However, when slicing the extruded product into convenient sizes, a number of problems arose. Mr. Werner developed a simple means for cutting the dough and returning the cutter to a position to cut the next succeeding dough, which is being continually forced from the nozzle. His invention solved the problem by developing a special path for cutting wire 39. However, as will be seen, this path made only one cut per cycle. The present invention, using a different apparatus, makes two cuts per cycle.

SUMMARY OF THE INVENTION

It is a prime object of the present invention to mass produce elongated cylindrical croquettes.

It is a second object of this invention to manufacture croquettes that have rounded hemispherical ends.

It is a third object of this invention that all croquettes be of uniform size and appearance.

It is an object of this invention to increase production productivity by making two croquettes in each cycle of a chopper.

It is yet another object of this invention to bread the croquettes.

It is another object of this invention to manufacture food products in a variety of shapes and sizes.

It is yet another object of this invention to have a reliable and economical machine to produce croquettes in as simple a manner as possible.

BRIEF DESCRIPTION OF THE DRAWING

The invention is illustrated by way of example with accompanying drawings which form part of this application and which.

DESCRIPTION OF THE PREFERRED EMBODIMENT

Figure 1:
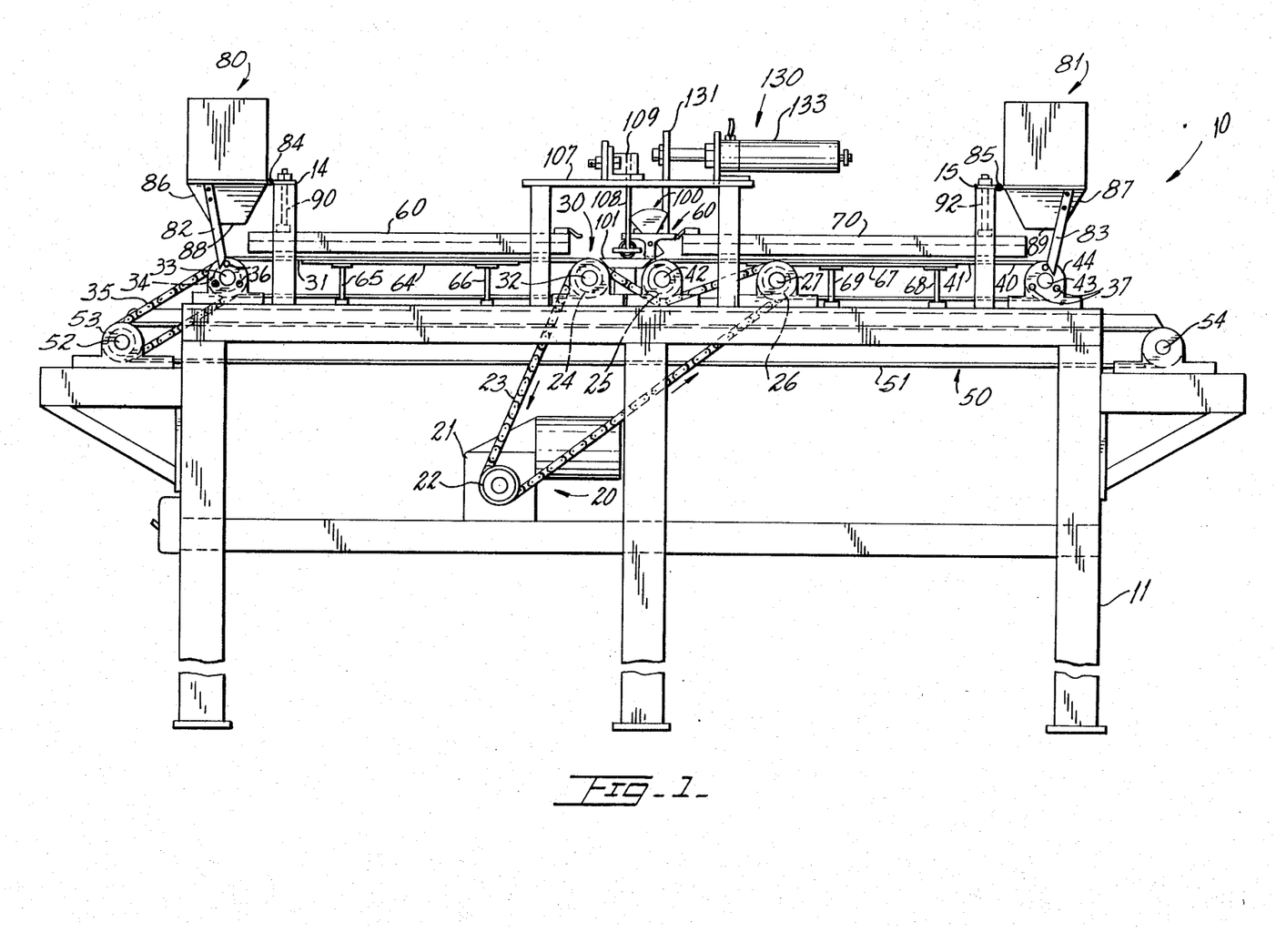
FIG. 1 is a front view of the croquette machine.

The present invention is represented generally by numeral 10 as shown in FIG. 1, which includes table 11, motor drive 20, left conveyor 30, right conveyor 40, transport conveyor 50, left shaker 80, right shaker 81, chopper assembly 100, and piston assembly 130.

Motor drive 20 includes a motor means 21, which in the preferred embodiment is an electric motor having an output sprocket 22 driving link chain 23 in a counter-clockwise rotation. Three additional sprockets are driven by chain 23; sprocket 24 and sprocket 26 are driven in a counter-clockwise direction while sprocket 25 is driven in a clockwise direction. Sprocket 26 makes an odd number of driven sprockets, chain 23 wraps around sprockets 24 and 25 differently, so that sprockets 24 and 25 rotate outwardly from the center in different directions.

Sprockets 24 and 25 are attached to shafts 32 and 42 respectively. Shaft 32 rotates counter-clockwise and shaft 42 rotates clockwise. Sprocket 26 is attached to shaft 27.

Two separate conveyors 30 and 40 are driven by said shaft 32 and shaft 42 respectively. Conveyor 30, at the left half of the machine, includes endless belt 31 supported by rotating shaft 32 at one end and by rotating shaft 33 at its other end. Endless belt 31 is driven in a counter-clockwise direction by shaft 32 which is directly connected to sprocket 24.

Conveyor 40, located at the right half of the machine, includes endless belt 41 supported by rotating shaft 42 at one end and by rotating shaft 43 at its other end. Endless belt 41 is driven in a clockwise direction by shaft 42 which is directly connected to sprocket 25.

Figure 2:
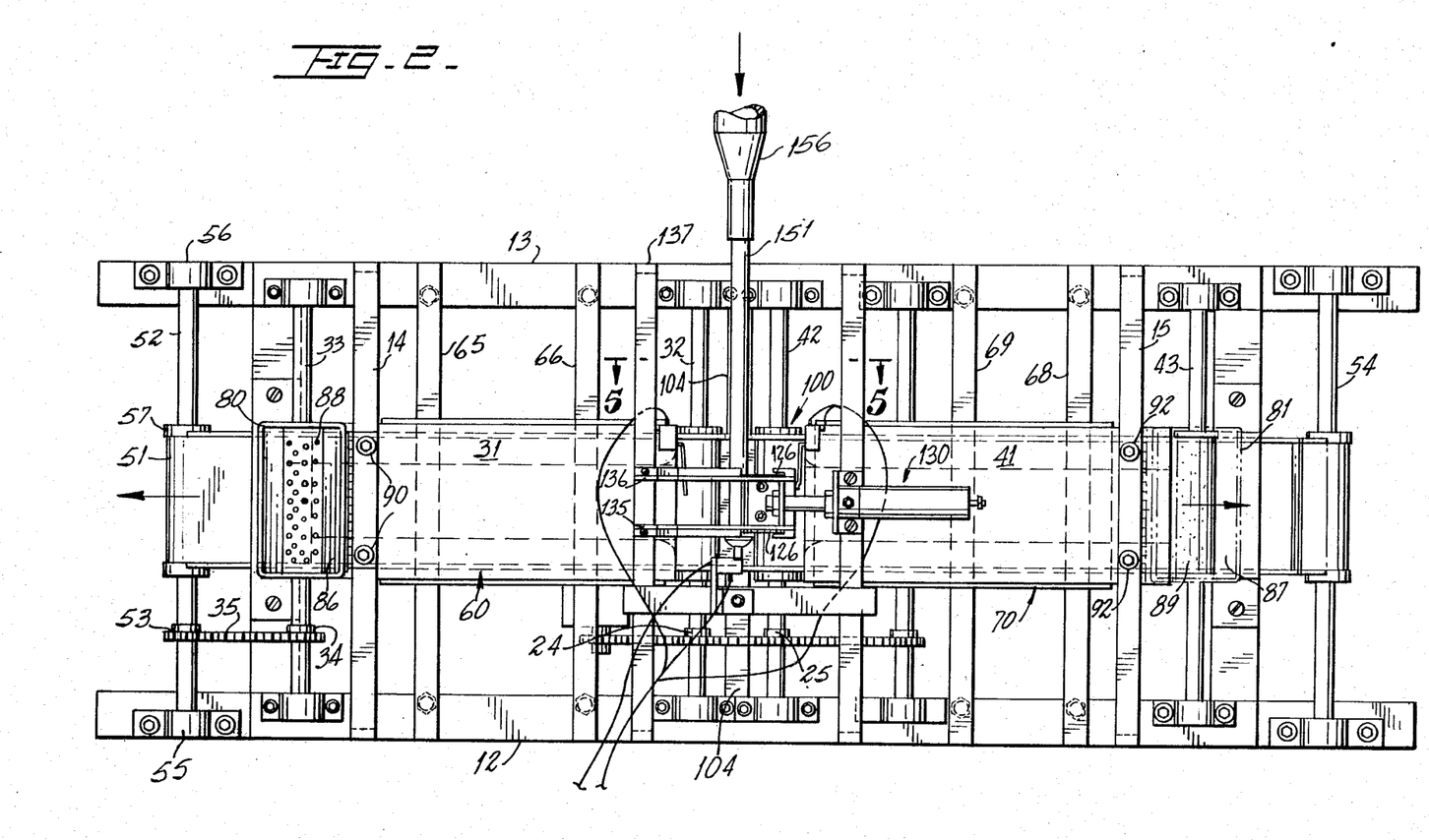
FIG. 2 is a plan view of the croquette machine, wherein the front of said machine is at the bottom of the drawing.
Figure 3:
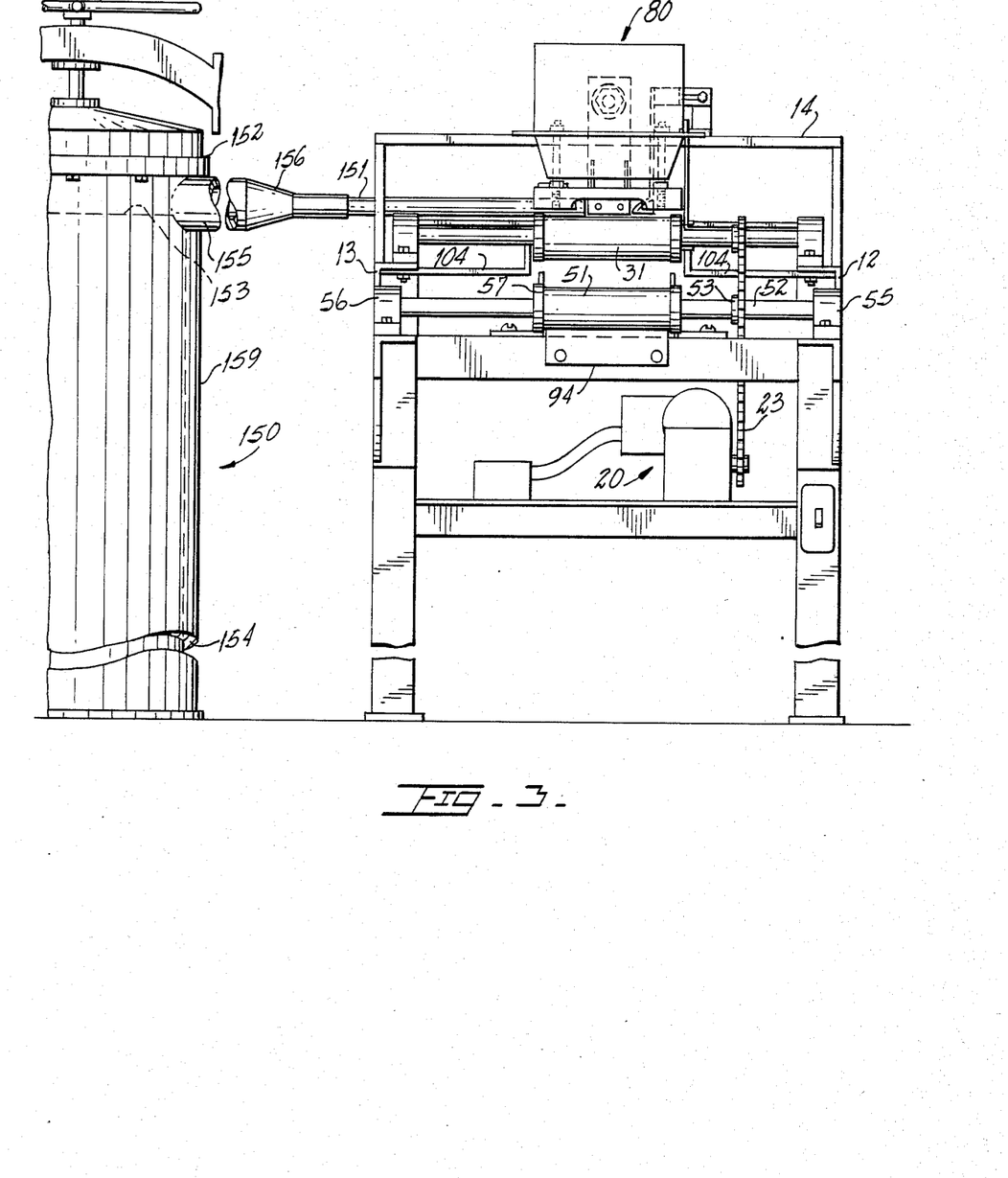
FIG. 3 is a left end view of the croquette machine and the stuffer.

A typical shaft in the preferred embodiment that supports an endless conveyor belt, such as shafts 32, 42, 33, 43, 52 and 54, can best be seen in FIG. 2, illustrated by shaft 52 and in FIG. 3, also illustrated by shaft 52. Each shaft is supported at each of its ends by bearing support means 55 and 56 which is mounted to front side 12 and back side 13 respectively of table 11. Shaft 52 is of solid core. Cylindrical spacer 57, having a diameter greater than the shaft diameter and a width approximately equal to said endless belt 51, is seated on said shaft 52. Endless belt 51 is seated on said spacer 57, such that the turning of shaft 52 directly rotates spacer 57 and belt 51.

Attached to shaft 33, FIG. 1, is sprocket 34 which is connected to sprocket 53 by link chain 35. Shaft 52 is directly connected to sprocket 53. Shaft 52 drives endless belt 51 and supports same at one end. Shaft 54 supports belt 51 at its other end. Shaft 33 rotates counter-clockwise driving chain 35, shaft 52, sprocket 53 and endless belt 51 in counter-clockwise rotation.

Located above left conveyor 30 is left tunnel assembly 60 and above right conveyor 40 is right tunnel assembly 70. Each elongated tunnel is parallel to and slightly above endless belts 31 and 41 respectively, such that the length of each tunnel is aligned with the direction of belts 31 and 41.

Tunnel assembly 60 is releasably held in place above belt 31 by adjustable bolts 90 at one end and by bolts 91 at its other end. Bolts 90 and 91 can be finely adjusted to raise and lower tunnel 60. Directly below and parallel to tunnel 60 is platform 64 supported at either end by brackets 65 and 66. Endless belt 31 passes over platform 64 such that said belt 31 is between tunnel 60 and platform 64. Bolts 90 descend from beam 14.

Likewise tunnel 70 is releasably held in place above belt 41 by adjustable bolt 92 at one end and by bolt 93 at its other end. Bolts 92 and 93 can be finely adjusted to raise and lower tunnel 70. Directly below and parallel to tunnel 70 is platform 67 supported at either end by brackets 68 and 69. Endless belt 41 passes over platform 67 such that said belt 41 is between tunnel 70 and platform 67. Bolts 92 descend from beam 15.

Figure 6:
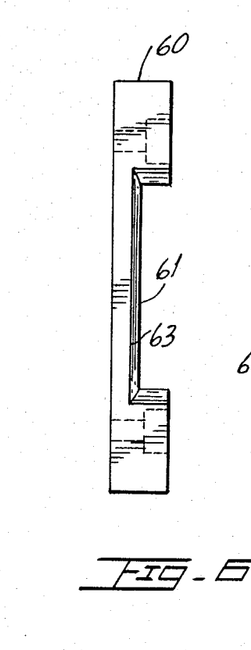
FIG. 6 is an end view of a tunnel from the center of the machine.
Figures 7, 8:
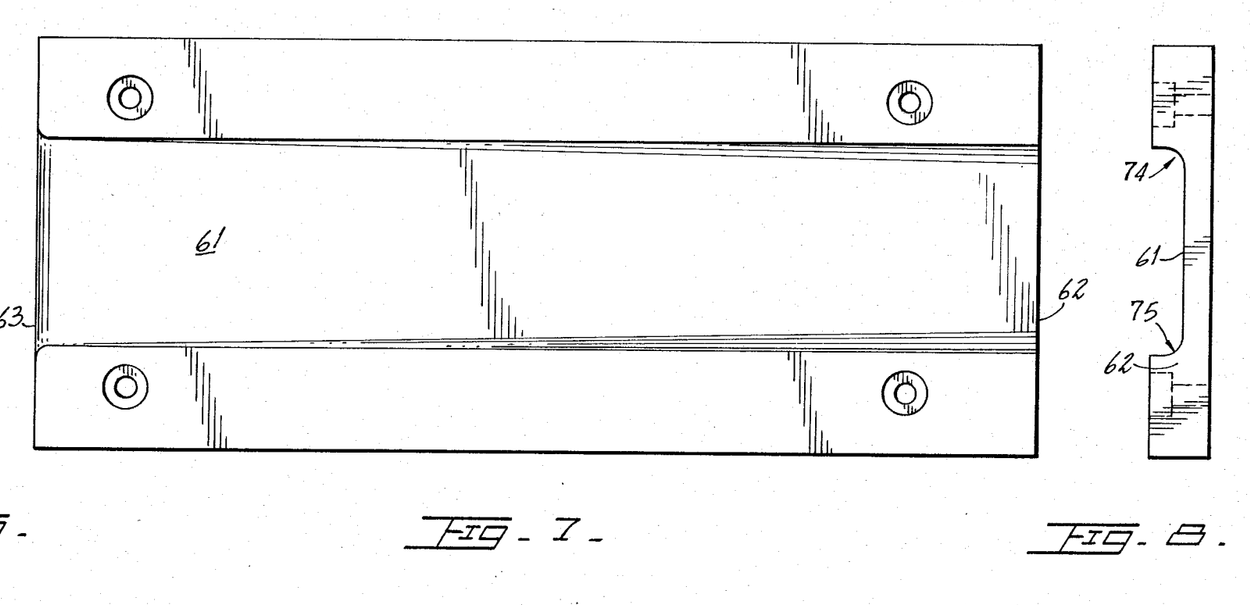
FIG. 7 is a bottom view of the tunnel.
FIG. 8 is an end view of a tunnel from the outside edge of the machine looking into the center.
Figure 9:
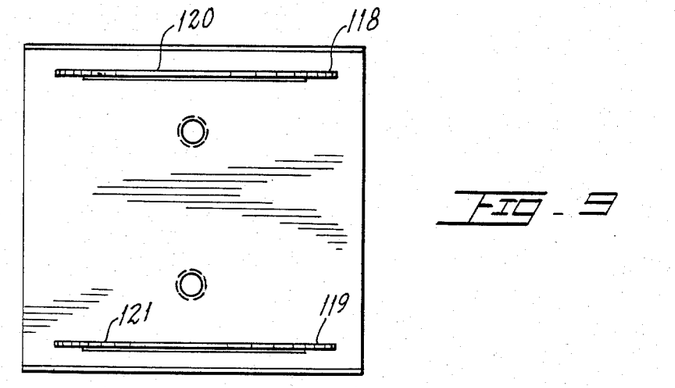
FIG. 9 is a plan view of the chopper.

As seen in FIGS. 6, 7, and 8, at the bottom of tunnel assembly 60, an elongated passageway 61 extends from one end to the other. Passageway 61 is tapered such that its width converges from end 63 to end 62.

Similarly, right tunnel assembly 70 is parallel to and slightly above conveyor 40 and includes passageway 71 which is tapered such that its width converges from end 73 to end 72.

Larger ends 63 and 73 for each tunnel assembly 60 and 70 are towards the center of croquette machine 10, and the smaller shaped ends 62 and 72 are located at the outer ends of said croquette machine 10.

As will be shown later, passageway 61 is designed to shape a croquette in an elongated fashion, having rounded spherical ends. Thus, as seen in FIG. 8, edges 74 and 75 of passageway 61 are rounded in a half hemisperical shape to shape said croquettes. Likewise, ends 63 and 73 have tapered corners at passageways 61 and 71 respectively for easy entry of croquettes into said passageways. Said tunnel assemblies are releasably connected such that other tunnel assemblies of different size or shape can be connected to change the size or shape of the croquette. Passageway 71 operates and is similarly constructed.

Referring to FIG. 1, shakers 80 and 81 are pivotally supported on beams 14 and 15 respectively, at the outer edges of croquette machine 10 above shafts 33 and 43 respectively. In the preferred embodiment, each shaker is rocked by means of a plurality of cams 36 and 37 respectively on sprockets 34 and 44 respectively. Elongated flanges 82 and 83 are rigidly attached to and extend from bottoms 86 and 87 of each shaker. Each shaker pivots at hinge 84 and 85, such that cams 36 and 37 rock flanges 82 and 83, causing shakers 80 and 81 to be jolted by pivoting at hinges 84 and 85.

Figure 4:
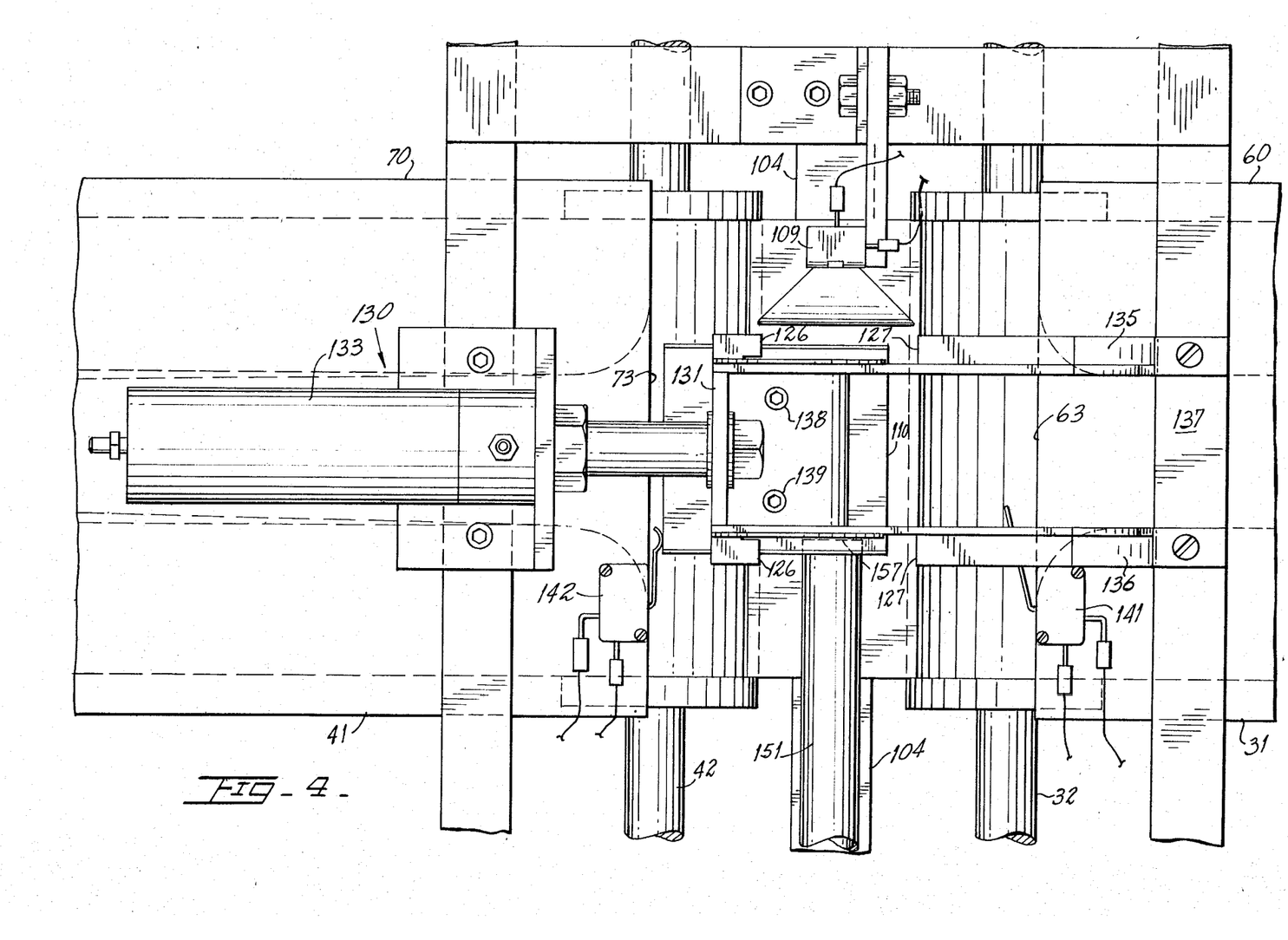
FIG. 4 is an exploded plan view of the center of the croquette machine showing the pusher, and a portion of the tunnels, wherein the front of the machine is at the top of the drawing.
Figure 5:
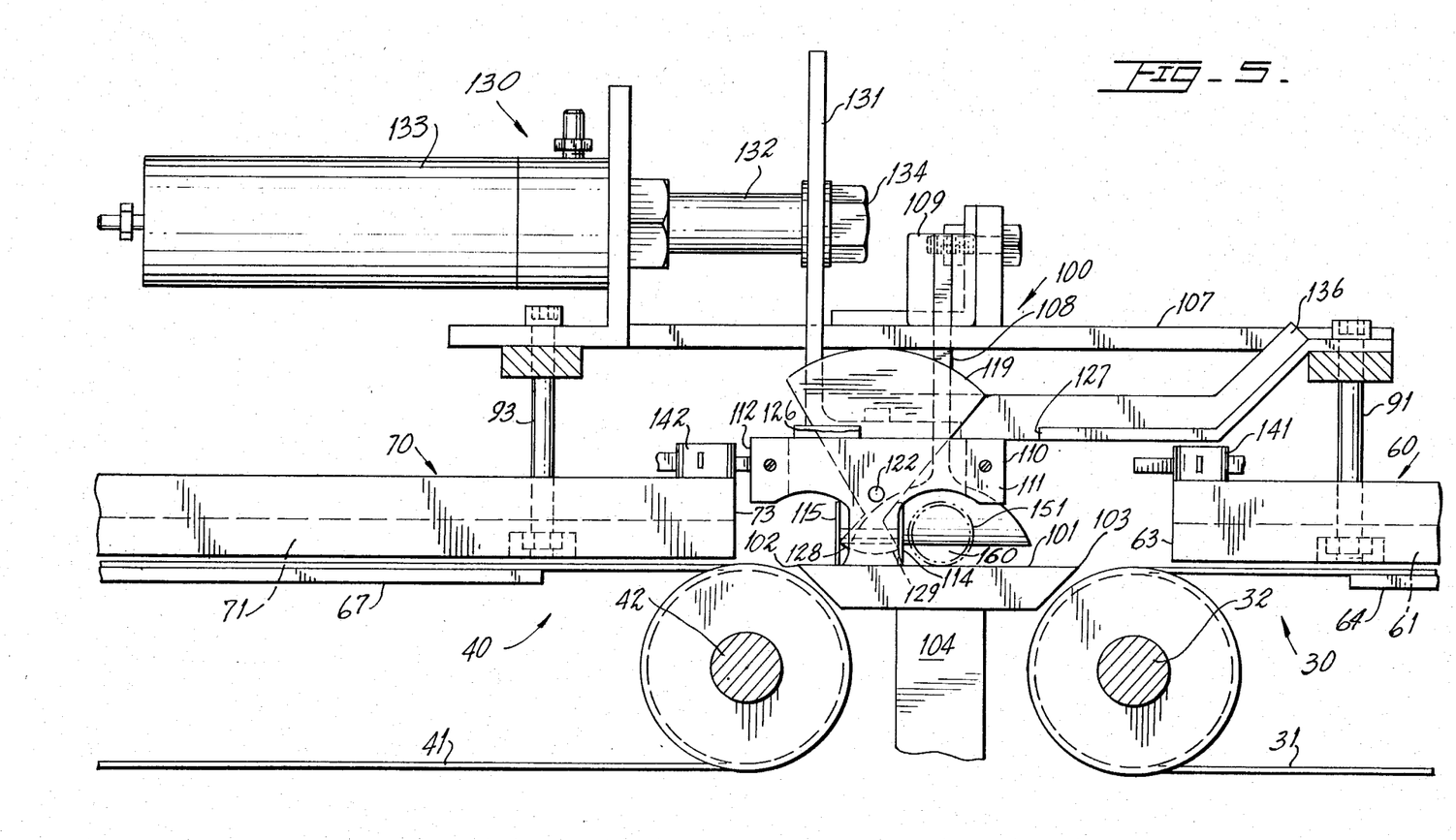
FIG. 5 is an exploded sectional rear view of the pusher and conveyors taken along line 5—5 in FIG. 2.

At the center of croquette machine 10 is chopper assembly 100, shown generally in FIGS. 4 and 5. Referring to FIG. 5, (a rear view), base 101 is located between left conveyor 30 and right conveyor 40 in close proximity to shafts 32 and 42, such that ends 102 and 103 of base 101 extend to close proximity of endless belts 31 and 41. Base 101 is mounted on beam 104.

Chopper 110 is driven back and forth in a reciprocating motion from end 102 to end 103 across base 101. Chopper 110 is attached to piston assembly 130 by means of bracket 131 which is attached by bolts 138 and 139 to the top of chopper 110. Flange 131 is releasably connected by bolt 134 to piston rod 132, which reciprocates in and out of cylinder 133.

In the preferred embodiment, piston assembly 130 is pnuematically driven. There are two phases within each cycle such that piston rod 132 is extended or retracted. In the extended phase, chopper 110 is in close proximity to end 103. In the retracted phase, chopper 110 is in close proximity to end 102. The direction of piston assembly 130 is controlled by means of two switches 142 and 141, located atop and at ends 73 and 63 of tunnels 70 and 60 respectively.

Figure 10:
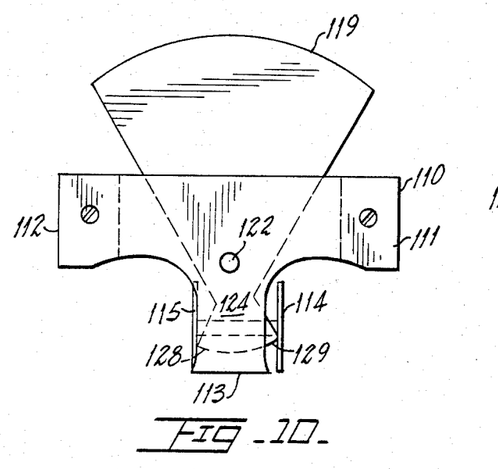
FIG. 10 is a front view of the chopper.
Figure 11:
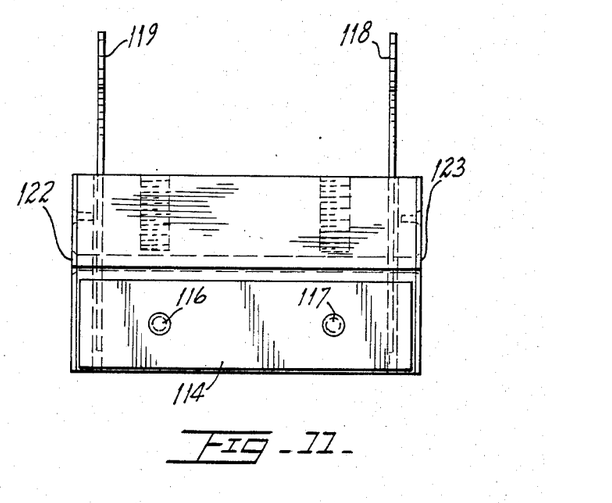
FIG. 11 is an end view of the chopper.
Figure 12:
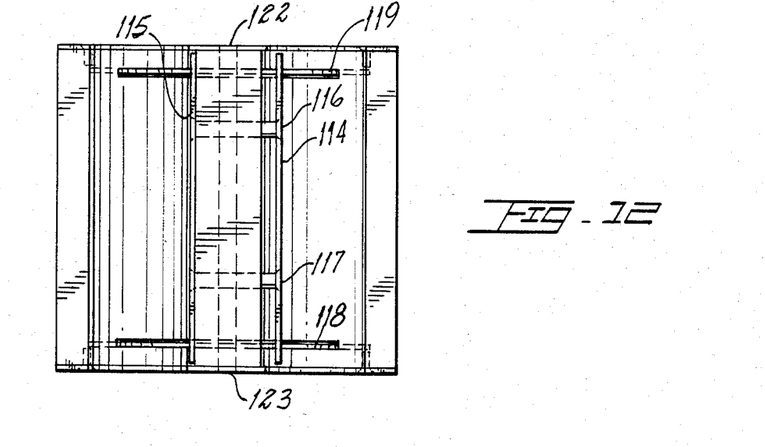
FIG. 12 is a bottom view of the chopper.

Chopper 110 is 'T' shaped, having sides 111 and 112 with bottom 113 as the bottom edge of the 'T' (FIG. 10).

As shown in FIG. 5, switch 142 is in contact with side 112, which will cause a change of direction in piston assembly 130 to drive chopper 110 in the opposite direction towards end 103. Likewise, when end 111 of chopper 110 contacts switch 141, piston assembly 130 reverses direction, such that chopper 110 will be driven back towards end 102 of base 101, where again side 112 of block 110 activates switch 142. The direction of chopper 110 and piston rod 132 is continuously changed with chopper 110 moving back and forth across base 101.

Two parallel pushers 114 and 115 are located at the base and in the upright column 124 of the 'T'. Each pusher is rigidly connected by cross bars 116 and 117. The width of bottom 113 is less than the distance of crossbars 116 and 117 between pushers 114 and 115.

Double cams 118 and 119 are perpendicular to pushers 114 and 115 and fit within slots 120 and 121 of chopper 110. Said double cams 118 and 119 pivot at points 123 and 122 respectively. Brackets 135 and 136, FIG. 4, are cantelevered from beam 137 and include an elongated notch defined by points 126 and 127 in each said bracket. Said notches interact with double cams 118 and 119 as explained below.

As chopper 110 is urged back and forth across base 101, double cams 118 and 119 engage points 126 and 127 close to the end of each phase of the cycle when chopper 110 is close to either end 102 or 103. As chopper 110 comes to the end of a phase, the upper portion of cam 119 is urged backward, causing lower cams 128 and 129 to thrust forward in the direction of motion while correspondingly thrusting pushers 114 or 115 forward.

As seen in FIG. 3, in this preferred embodiment, stuffer 150 is connected to table 11 by means of elongated pipe 151. Stuffer 150 includes cylindrical container 159 with removable top 152. Piston 153 is driven upward within walls 154. Any mass 160 (not shown) of material within stuffer 150 is correspondingly driven upward and forced out of opening 155 through nozzle 156. Nozzle 156 is extended by pipe 151, such that mass 160 is urged through said pipe 151. In this preferred embodiment, mass 160 would be a pre-prepared edible elastic food stuffing for making croquettes.

Pipe 151 extends to the rear of base 101. End 157 of pipe 151 is in close proximity to the rear side of chopper 110.

In use, mass 160 is urged from nozzle 156 out of end 157 of elongated pipe 151. Mass 160 is shaped and molded by pipe 151 into an elongated cylindrical form, conforming to the size, shape and diameter of pipe 151. As mass 160 extends from end 157, it rests on base 101. As mass 160 is urged from pipe 151, the leading edge of said mass engages lever 108 of switch 109. Said lever 108 activates switch 109 which is adjustable to control the length of the extension of mass 160. Once switch 109 is activated, chopper 110 starts a phase of its cycle moving past end 157 of pipe 151, severing or shearing a section of the extended elongated mass and creating a severed mass or croquette (not shown). The direction of said chopper having previously been determined by switch 141 or 142. Said croquette now rests on base 101 in front of chopper 110 and adjacent to either pusher 114 or 115. Platform 107 supports switch 109 and piston assembly 130.

Chopper 110 pushes the croquette towards tunnel 70. When the chopper approaches edge 102, cam 119 engages flange 126 and pusher 115 thrusts the croquette towards and onto endless belt 41, off base 101 and into tunnel 70. Without this additional thrust the croquette has a tendency to stick to the chopper assembly.

Simultaneously, side 112 of chopper 110 engages switch 142, causing piston assembly 130 to reverse the direction of chopper 110, which will then be ready to move towards tunnel 60, when switch 109 is next activated by the extruding mass 160, pushing against lever 108.

The flow of mass 160 continues from nozzle 156 past end 157. As previously described, chopper 110 shears off an elongated section of the protruding mass 160, creating another croquette. However, in this phase, the croquette is on the opposite side of chopper 110 in front of pusher 114 in close proximity to same.

The croquette is urged toward tunnel 60 by chopper 110. As chopper 110 comes in close proximity to edge 103 of base 101, cam 119 engages flange 127, pusher 114 thrusts said croquette off base 101 onto endless belt 31 and into tunnel 60.

Simultaneously, side 111 of chopper 110 engages switch 141, causing piston assembly 130 to reverse the direction of chopper 110. Thus the machine repeats the continuous cycles of chopper 110's back and forth motion.

There is a continuous flow of mass 160 formed into severed elongated cylinders. Chopper 110 makes two croquettes in each cycle: One croquette is urged towards tunnel 70 and the other croquette is urged toward tunnel 60. As can now be seen, it is not necessary to interrupt the continuous flow of mass from the nozzel. The chopper shears off a section and moves forward to urge the croquette off base 101. The width of the chopper is narrow, such that the flow of mass from nozzle 156 continues as the chopper moves forward. The new mass is positioned behind the direction of movement of the chopper. When the chopper returns there is a new length of mass to sever, but now the chopper is moving in the opposite direction.

As each croquette enters a tunnel assembly 60 or 70, it is rolled along and within said tunnel by endless belts 31 and 41. Within said tunnel said croquette is within passageway 61 or 71. It is gradually compressed and shaped to correspond to the shape of said passageway by pressure asserted between said passageways and platforms 64 and 67. At the end of each tunnel assembly, the croquette has a perfect shape with rounded hemispherical ends.

Food particles, namely bread crumbs (not shown) are stored within shakers 80 and 81. As each shaker is jolted, bread crumbs drop from funnel shaped bottoms 86 and 87 which have openings 88 and 89, onto respective conveyor belts 31 and 41. Said bread crumbs adhere to each respective endless belt by means of water or other fluids deposited by and from the mass 160. As the elongated mass is urged into passageways of tunnels 60 and 70, said bread crumbs create friction, causing said mass to easily roll within said passageways. Rolling makes a more uniform shape. In addition, some bread crumbs become impregnated into said croquettes by means of pressure created between said tunnels and said platforms 64 and 67. This is a desirable characteristic, having croquettes with bread crumbs. The amount of bread crumbs dispersed is relative to the speed of the conveyors and it could also be adjusted by varying the size of openings 88 and 89. As the finished croquettes drop to transport conveyor 50, some bread crumbs drop off said croquettes and adhere to said conveyor 50. Scraper 94, FIG. 3, located at the underside of conveyor 50 and rigidly attached to the end of table 11, scrapes belt 51 causing said bread crumbs to drop into a collection tray not shown.

The croquettes that travel on conveyor 40 travel through tunnel 70, exiting at end 72, are carried over shaft 43 and drop onto transport conveyor 51, where the croquettes are transported to the left end of croquette machine 10.

The croquettes that travel on conveyor 30 travel through tunnel 60, exiting at end 62, are carried over shaft 33 and drop onto transport conveyor 51 where these croquettes also are transported toward the left end of croquette machine 10. In the preferred embodiment, these croquettes are transferred by additional conveyor means to a packing area.

While but a single embodiment of the present invention has been here specifically disclosed, it will be apparent that many variations may be made therein, all within the scope and spirit of the invention.

What is claimed is:

1. A machine for manufacturing food products made from a source of food mass comprising:
    (a) a nozzle assembly for continuously discharging said food mass;
    (b) a reciprocating chopper in close proximity to said nozzle assembly for severing said food mass from said nozzle whereby said severed mass is positioned adjacent said chopper;
    (c) a tunnel in spaced apart relation to said chopper, said tunnel having a shaped internal passageway; and
    (d) a conveyor extending from adjacent said chopper and along the length of said tunnel for receiving said severed mass and urging said severed mass along said passageway whereby said severed mass is shaped by said passageway during its movement along said tunnel.

2. A machine for manufacturing food products made from a source of food mass comprising:
   (a) a nozzle assembly for continuously discharging said food mass;
   (b) a platform in close proximity to said nozzle assembly;
   (c) a reciprocating chopper in spaced apart relation to said platform constructed and arranged to move back and forth across said platform for severing said food mass discharged from said nozzle to form a cut food mass whereby said cut food mass is positioned on said platform adjacent said chopper and in front of the direction of movement of said chopper such that said reciprocating chopper pushes said cut food mass from said platform in alternating opposite directions;
   (d) a first conveyor disposed to one side of said platform for receiving said cut food mass moved in a first of said opposite directions; and
   (e) a second conveyor disposed to the opposite side of said platform for receiving said cut food mass moved in the other of said directions, whereby said first conveyor receives said cut food mass when said chopper moves in one direction relative to said platform and said second conveyor receives a second cut food mass when said chopper moves in the opposite direction relative to said platform, whereby for each back and forth movement of said chopper two cut food masses are formed.

3. A machine as recited in claim 2, further comprising:
   (a) a first tunnel in coextensive relation to a portion of said first conveyor; and
   (b) a second tunnel in coextensive relation to a portion of said second conveyor, said first tunnel and said second tunnel each having a shaped internal passageway associated with each of said tunnels such that said cut food mass is urged along within said passageway by said related conveyors and is shaped during movement along said passageways to form a shaped food mass.

4. A machine as recited in claim 3, further comprising a third conveyor in spaced apart relation to said first conveyor and said second conveyor for receiving said cut food masses from said first conveyor and said second conveyor.

5. A machine as recited in claim 4, further comprising:
   (a) a first container located above said first conveyor; and
   (b) a second container located above said second conveyor such that said first container disperses its contents onto said first conveyor beneath said first container and said second container disperses its contents onto said second conveyor beneath said second container.

6. A machine as in claim 2, further including a chopper assembly adapted to cooperate with a source of food mass discharged from said nozzle assembly, said chopper assembly comprising:
   (a) said platform receiving the output of food mass from said nozzle assembly; and
   (b) a reciprocating block member in spaced apart relation to said platform constructed and arranged to move back and forth across said platform for severing said food mass from said nozzle assembly to form a cut food mass whereby said cut food mass is positioned on said platform adjacent said block member and in front of the direction of movement of said block member whereby said block member urges said cut food mass away from said nozzle assembly and onto said first conveyor or said second conveyor and is repositioned to sever another food mass discharged from said nozzle assembly.

7. A machine including a chopper assembly as recited in claim 6, wherein for each back and forth cycle of said reciprocating block member, two food masses are severed such that one of said cut food masses is urged in one direction relative to said platform and the other of said cut food masses is urged in the opposite direction relative to said platform.

8. A machine including a chopper assembly as recited in claim 7, including a pusher means comprising:
   (a) a pair of parallel spaced apart pusher members on opposite sides of said block member whereby said pusher member is between said cut food mass and said block member; and
   (b) a cam assembly for thrusting said pusher members in the direction of travel of said block member, such that said cut food mass is thrusted by said pusher member away from said block member preventing said cut food mass from sticking to said pusher member.

9. A machine including a chopper assembly as recited in claim 8, wherein said cam assembly comprises:
   (a) a pair of double cams pivotally connected on each side of said block member, each said cam having an upper cam and a lower cam; and
   (b) a notch assembly cooperating with each said double cam such that when said block member approaches the edge of said platform, said upper cam strikes said notch thrusting said lower cam and said pusher member forward.

10. A machine including a chopper assembly as recited in claim 8 further comprising:
    (a) a piston assembly attached to said block member for driving said block member in a back and forth reciprocating motion;
    (b) a first sensor constructed and arranged for sensing the position of said block member;
    (c) a second sensor constructed and arranged for sensing the position of said block member; and
    (d) a third sensor constructed and arranged for controlling the length of said food mass extending from said nozzle whereby at a predetermined length of food mass, said third sensor activates said piston assembly to drive said block member in the direction determined by said first sensor or said second sensor.

11. A machine including a chopper assembly as recited in claim 10 wherein said block member is an elongated 'T' shaped block in spaced apart relation to said platform and attached to said piston assembly.

12. A machine for manufacturing food products severed from a food mass and transported on said conveyor as recited in claim 1, said machine further including a shaker assembly that comprises:
    (a) a container mounted on said machine in spaced apart relation to said conveyor for storing food particles therein; and
    (b) rocker means attached to said container for dispersing said food particles onto said conveyor.

13. A machine for manufacturing food products made of food mass as recited in claim 1, wherein said tunnel comprises:
   (a) a rectangular tunnel block in spaced apart relation to said conveyor;
   (b) a pressure plate in spaced apart relation to said tunnel block for supporting a portion of said conveyor between said tunnel and said pressure plate; and
   (c) elongated open passageway in said tunnel block for receiving a cut food mess, whereby said passageway converges from one end to the other and includes shaped edges, whereby said cut food mess is compressed slightly between said passageway and said pressure plate and said cut food mess rolls through said passageway urged by said conveyor and assumes the shape of said passageway.

14. A machine for manufacturing food products made of food mass as recited in claim 3, wherein each of said tunnels comprises:
   (a) a rectangular tunnel block in spaced apart relation to said conveyor associated therewith;
   (b) a pressure plate in spaced apart relation to said tunnel block for supporting a portion of said associated conveyor between said tunnel and said pressure plate; and
   (c) an elongated open passageway in said tunnel block for receiving a cut food mass, whereby said passageway converges from one end to the other and includes shaped edges, whereby said cut food mass is compressed slightly between said passageway and said pressure plate and said cut food mass rolls through said passageway urged by said associated conveyor and assumes the shape of said passageway.

* * * * *